May 31, 1955

D. E. WOLPERT 2,709,368

SOIL TESTING DEVICE

Filed Jan. 28, 1954

INVENTOR.
David Earl Wolpert
BY
Horace B. VanValkenburgh
ATTORNEY

May 31, 1955
D. E. WOLPERT
SOIL TESTING DEVICE
2,709,368
Filed Jan. 28, 1954
3 Sheets-Sheet 2
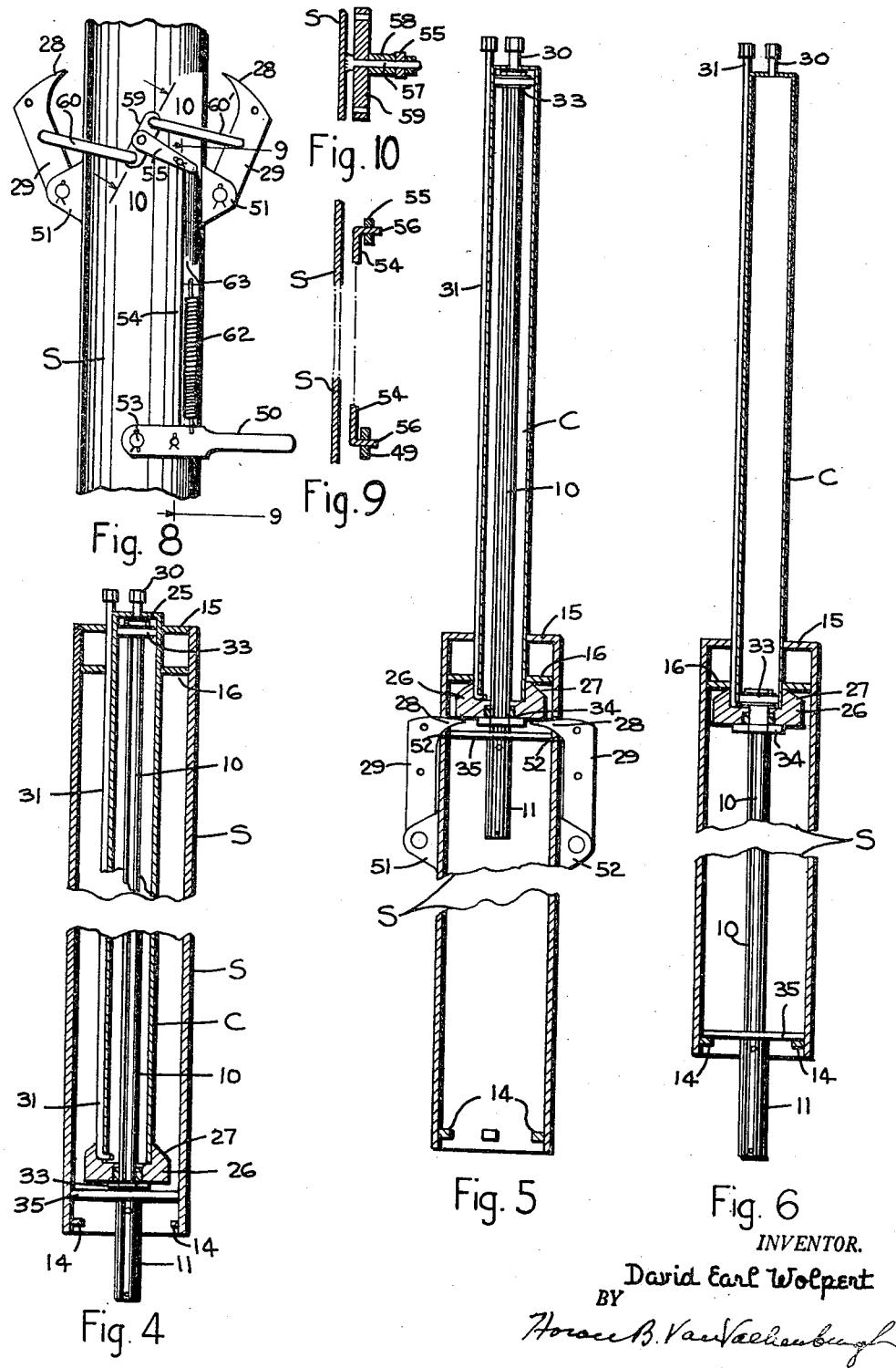
INVENTOR.
David Earl Wolpert
BY
Horace B. Van Valkenburgh
ATTORNEY May 31, 1955

D. E. WOLPERT 2,709,368

SOIL TESTING DEVICE

Filed Jan. 28, 1954

INVENTOR.
David Earl Wolpert
BY
Horace B. Van Valkenburgh
ATTORNEY

United States Patent Office 2,709,368
Patented May 31, 1955

2,709,368

SOIL TESTING DEVICE

David Earl Wolpert, Adams County, Colo.

Application January 28, 1954, Serial No. 406,641

11 Claims. (Cl. 73—421)

This invention relates to devices for testing soil and the like.

In testing soil, as for agricultural or other purposes, it is often desired to obtain soil samples at a plurality of spaced points over a given area. If an auger or bit is used, the soil is disturbed, the depth at which a particular part of the sample is obtained may not be known with exactitude, hand operation is cumbersome and time consuming, and machine operation is expensive both in initial cost and upkeep. If the depth at which the samples are to extend is not too great, satisfactory samples can be obtained by driving a tube or pipe into the earth, and removing the tube with the sample contained therein. However, to drive the tubes into the soil by hand is a cumbersome and laborious process, while if a soil tube is driven by an air hammer or similar device, the removal of the tube, after it is driven, is not always easy. Also, while air hammers and the like can be transported, their use consumes unnecessary time and physical effort.

Among the objects of the present invention are to provide a novel device for testing soil and the like; to provide such a device which may be mounted on a truck or other vehicle and operated therefrom; to provide such a device which may be operated hydraulically, and thereby reduce to a minimum the amount of time for pushing a soil tube into the earth and removing the same therefrom; to provide such a device which will accommodate soil tubes of sufficient length; to provide such a device which requires a minimum amount of time to set up for operation; to provide such a device which does not extend to an undue height above a truck or other vehicle, particularly when being transported along a highway or the like; to provide such a device which is efficient and effective in operation; to provide such a device which can be manufactured relatively economically; and to provide such a device which can withstand the rigours of rough and hard usage.

Additional objects and the novel features of this invention will become apparent from the description which follows, taken in connection with the accompanying drawings, in which:

Fig. 4 is a condensed, vertical section of the same, on an enlarged scale and with the parts in the position of Fig. 1;

Fig. 5 is a condensed, vertical section, similar to Fig. 4, but with certain parts in upper position;

Fig. 6 is a similar condensed, vertical section, with certain parts in upper position and others in lower position;

Fig. 8 is a fragmentary rear elevation, on an enlarged scale, taken from the position of line 8—8 of Fig. 2;

Fig. 9 is a fragmentary, condensed, vertical section taken along line 9—9 of Fig. 8;

Fig. 10 is a fragmentary, oblique section, taken along line 10—10 of Fig. 8;

Figures 1, 2, 3, 7:
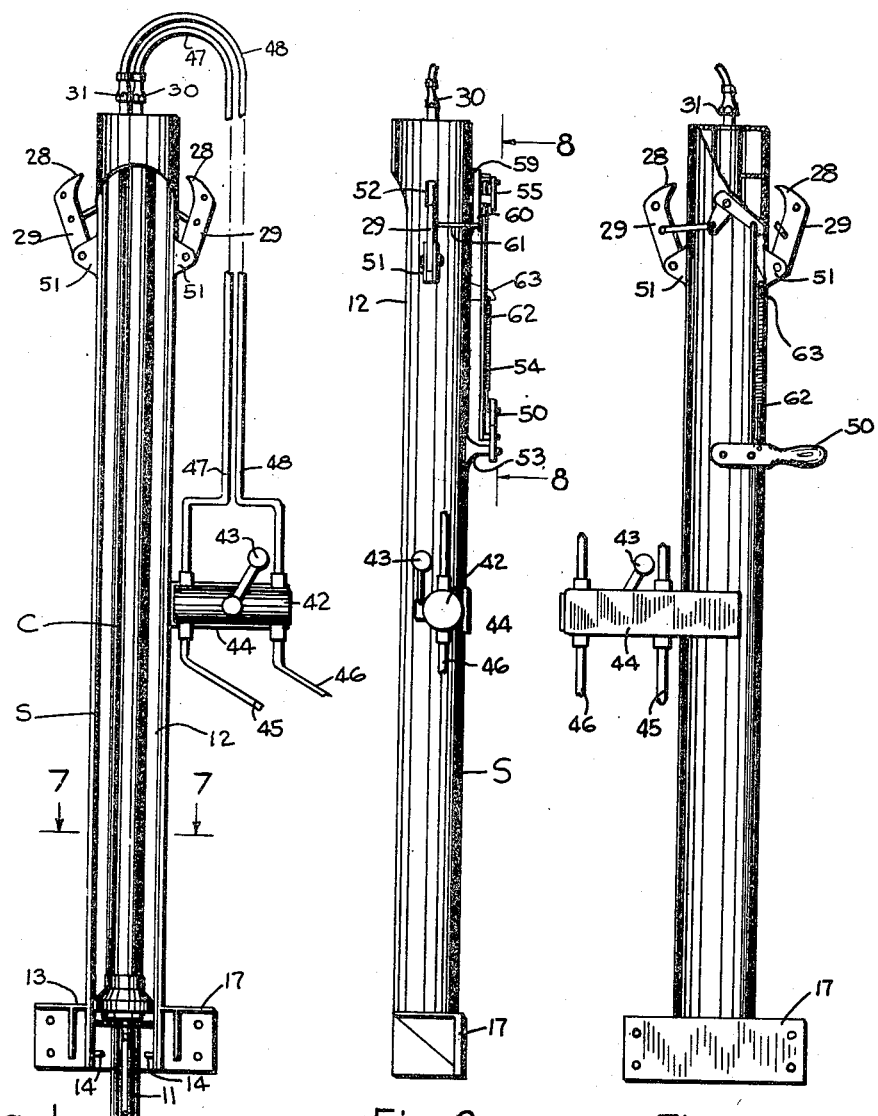
Fig. 1 is a front elevation of a device for testing soil and the like, constructed in accordance with this invention.
Fig. 2 is a side elevation of the same.
Fig. 3 is a rear elevation of the same.
Fig. 7 is a horizontal section, on an enlarged scale, taken along line 7—7 of Fig. 1.
Figure 13:
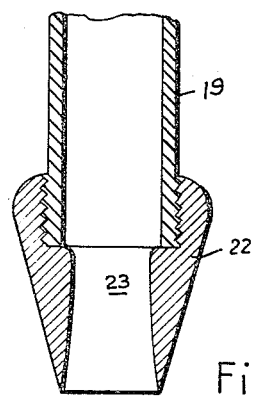
Fig. 13 is an enlarged fragmentary, vertical section showing particularly the point or lower end of the soil tube shown in Fig. 11.

As illustrated in Figs. 1–3, inclusive, a device for testing soil and the like, constructed in accordance with this invention, may comprise a hollow upright support S, a cylinder C which is disposed within the support S, as during transportation but is moved to an upper position during testing, and a soil tube carrier, such as a piston rod 10 (Fig. 4) which is movable into and out of cylinder C and is provided at its lower end with means for connecting a soil tube, such as a connector 11 to which a soil tube may be removably connected. Support S may comprise a section of relatively heavy pipe, cut away along spaced longitudinal lines to form an opening 12, which extends from the lower end to a point adjacent the upper end and which provides access to the interior of the support for connection and disconnection of the soil tubes. The support S is preferably reinforced at its lower end, as by a plate 13 which may be welded on the outside, as shown, with a series of stops 14 on the inside, stops 14 conveniently being blocks welded in spaced positions to the inside of support S. As in Figs. 4–6, an upper cap 15 and a guide plate 16, spaced below cap 15, may be welded to the inside of support S, cap 15 and plate 16 each having an aperture or hole to permit movement of cylinder C therethrough. Support S may be attached at its lower end, as by welding, to a bracket 17, to which plate 13 is also welded and by which the support S may be mounted on a beam 18 forming a part of the frame of a truck T, as in Fig. 11, or other type of vehicle. The device is adapted to push a soil tube 19 into the earth 20 to a predetermined depth, such as between five and six feet, and then withdraw the soil tube 19, so that the soil tube may be disconnected from the device and the soil sample contained therein will accurately represent the soil at all points of the hole 21 produced by thrusting the tube 19 into the earth. At its lower end, the soil tube 19 is preferably provided with a point 22, as shown in Fig. 13, which has a sharp, annular lower edge and a converging throat section 23 which insures that the soil sample will be retained within the tube 19 when it is withdrawn. The point 21 also is enlarged on the outside, so as to form a hole having a slightly greater diameter than the outer diameter of the soil tube 19 to permit readier movement of the soil tube into the hole and withdrawal of the same. As will be evident later, cylinder C is held in an upper position while soil tube 19 is being thrust into and withdrawn from the soil, the cylinder C being shown in its lower position in Fig. 11 to illustrate the fact that during transportation, the device does not extend upwardly an undue distance, which would be necessary if cylinder C were mounted atop support S. Thus, support S may remain in upright position, and does not require tipping or shifting for movement along a road or the like where overhead clearance might be limited.

Cylinder C, as in Fig. 4, may be formed from tubing which is closed at both ends, as by a cap 25 at its upper end and a bell 26 at its lower end, bell 26 having a diameter less than the inside diameter of support S and also an outwardly beveled surface 27 at its upper end, which will engage the inner ends 28 of a pair of dogs 29 as the cylindler C moves upwardly, the dogs then moving to a position beneath bell 26, so that the cylinder C will be locked in an upper position, as in Fig. 5. Thus, the cylinder C is movable within the support S and through the upper end thereof, between the position of Figs. 1 and 4 and the position of Figs. 5 and 6, preferably by hydraulic pressure, the hydraulic fluid being supplied under pressure to and exhausted from the upper end of cylinder C through a connection 30, and also supplied to and exhausted from the lower end of cylinder C through a pipe 31 which extends alongside the cylinder from its upper to its lower end, as in Fig. 5. Pipe 31 is conveniently brazed to the side of cylinder C and enters the lower end thereof through the bell 26, and also may cooperate with the apertures in cap 15 and plate 16 of support S to prevent cylinder C from twisting during upward or downward movement. For such purpose, the apertures in cap 15 and plate 16 may be generally circular to correspond in shape to the outside of cylinder C, but provided with an enlargement or notch at one point to accommodate pipe 31, thereby being similar to the peripheral outline of cylinder C and pipe 31, shown in Fig. 7.

Figure 12:
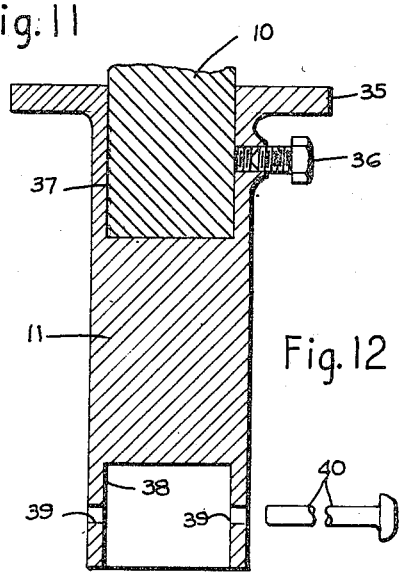
Fig. 12 is an enlarged, vertical section of a soil tube connector forming part of the device of Fig. 11.

Piston rod 10 has a piston 33 mounted on its upper end, within cylinder C, and passes through a packing gland 34 mounted in bell 26, and is also provided at its lower end with suitable means, such as a flange 35 adapted to cooperate with stops 14. The flange 35 not only cooperates with stops 14 in limiting downward movement of the piston rod, but also guides the lower end of piston rod 10 during its upward and downward movements within the support S. Flange 35 is conveniently integral with or welded to the connector 11 for soil tube 19, as in Fig. 12, the connector being attached to the piston rod in a suitable manner, as by a set screw 36, with rod 10 received in a cylindrical socket 37 formed at the upper end thereof. At its lower end, the connector 11 may be provided with a cylindrical socket 38 for the soil tube, the walls of socket 38 being provided with a pair of holes 39, so that a pin 40 may be slipped through the holes 39 and also through correspondingly located holes in the upper end of soil tube 19, to attach the soil tube to the connector in a readily removable manner. The soil tubes may be carried in the bed 41 of the truck T, or in any other suitable manner. The soil tubes utilized are preferably equal in length to the depth of the hole to be made when a sample is taken, plus the distance from the ground to the connector 11. Of course, the difference in elevation of the connector 11 between the position of Fig. 1 and the position of Fig. 5 should be equal to the maximum depth to which the soil tube is to be driven.

As in Figs. 1–3, a double acting hydraulic valve 42, having an operating handle 43, may be mounted on a bracket 44 which is welded or otherwise suitably attached to the support S. Valve 42 may be connected by a line 45 with a pump (not shown) or other conventional source of supply of hydraulic fluid under pressure, which may be carried in or mounted on the truck T, and also may be connected by a discharge line 46 with a reservoir (not shown), or other suitable receptacle for receiving fluid which is exhausted from either end of the cylinder C. Hydraulic lines 47 and 48, such as flexible hoses, lead from valve 42 respectively to the hydraulic connection 30 at the upper end of the cylinder and to the pipe 31, which in turn leads to the lower end of the cylinder. Hydraulic lines 47 and 48 have sufficient free length to permit the cylinder C to be elevated to the position of Fig. 5, and may be formed partly from fixed pipes extending to the level of the upper end of support S.

Figure 11:
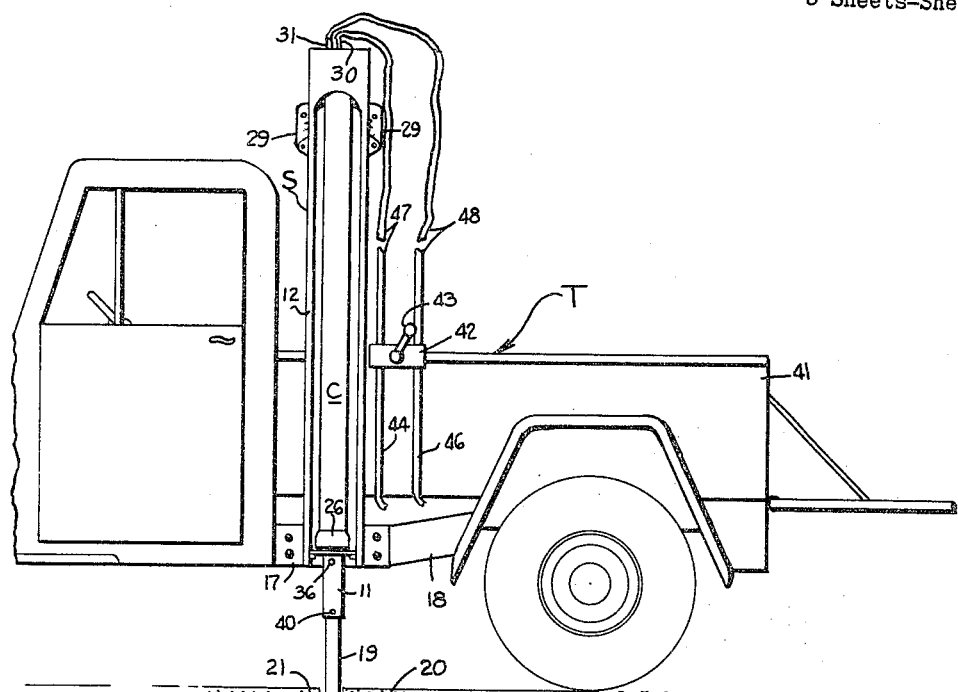
Fig. 11 is a side elevation of a small truck on which a device of this invention is installed, and illustrating also a soil tube penetrating the earth.

During transportation, the device is carried on a vehicle, such as the truck T, in the position of Fig. 11, but of course without soil tube 19 being connected thereto. The vehicle is driven to the first point at which a sample of soil is to be taken, and the valve handle 43 is moved to a position to supply fluid under pressure to the upper end of cylinder C, through connection 30. If not already in engagement therewith, the flange 35 will be pushed into engagement with stops 14, and the cylinder C will then be pushed to the upper position of Fig. 6 by pressure of fluid within the upper end of the cylinder and against the top of piston 33. During the latter portion of the movement of the cylinder, the locking dogs 29 will be pushed outwardly by bell 26 and will then swing inwardly to hold the cylinder C in its elevated position, with the bell resting on the dogs. Further upward movement of the cylinder C will of course be prevented by engagement of bell 26 with plate 16. By shifting the valve handle 43 to a position in which the upper connection 30 and upper end of the cylinder will be connected with the reservoir, for drainage, and fluid under pressure will instead be supplied to pipe 31 and the lower end of cylinder C, the pressure of fluid below piston 33 will pull the piston rod 10 upwardly to the position of Fig. 5. In this position, the soil tube 12 may be inserted within the support S through the opening 12, slipped into the lower end of connector 11, and pin 40 then slipped into place.

After the soil tube has been connected, handle 42 is moved to a position in which pipe 31 and the lower end of cylinder C are connected with the reservoir, and fluid is again supplied under pressure to upper connection 30, so that the piston 33 will be forced downwardly in the cylinder C, thereby moving the piston rod 10 downwardly to the position of Fig. 6 and pushing soil tube 19 into the ground. As soon as the soil tube has reached the desired depth, the pressure conditions in the cylinder C may be reversed, i. e., fluid under pressure supplied to the lower end of the cyclinder and the upper end of the cylinder drained, so that the piston rod 10 and soil tube 19 will again be lifted, the piston rod again moving to the upper position shown in Fig. 5. Then, the soil tube may be disconnected and replaced by another soil tube for the next test, if another test is to be made without lowering the cylinder C, since it will be evident that unless an overhead obstruction would prevent the same, the vehicle may be driven from one testing spot to another without the necessity of lowering the cylinder C, the latter being maintained in its upper position by dogs 29. After one or more or a series of tests has been completed, or it is necessary to lower the cylinder C for movement to another test spot, the piston rod is lowered to the position of Fig. 6 by draining the fluid from the bottom of the cylinder C and supplying fluid under pressure to the upper end of the cylinder C. Then, the dogs 29 may be moved outwardly to the position of Fig. 1, as through movement of a handle 50 of Figs. 3 and 8. At the same time, the pressure at the top of the cylinder may be released and the cylinder permitted to move downwardly by gravity, or by fluid pressure supplied to the bottom of the cylinder to accelerate downward movement thereof. This will place the cylinder C in the position of Fig. 4.

Each dog 29 may be pivoted on a bracket 51, welded to the support S, while each dog may be movable through a slot 52 in the support S, as in Figs. 2 and 5. Handle 50 may be pivotally mounted at its inner end on a pin 53 which extends outwardly from support S and is conveniently welded thereto, while a rod 54 connects handle 50 with a lever 55, rod 54 being pivotally connected to both handle 50 and lever 55, as through the turned ends 56 of rod 54, in the manner shown in Fig. 9. Lever 55 may be pivotally mounted at its inner end on a stud 57 which, as in Fig. 10, extends outwardly from support S and is conveniently welded thereto, while lever 55 may be attached, as by welding, to one end of a short tube 58, the opposite end of which is connected, as by welding, to a link 59. As will be evident, lever 55, tube 58 and link 59 are pivotal as a unit about stud 57. The opposite ends of link 59 are respectively connected by rods 60 and 60', with the respective dogs 29, each dog being provided with an arm 61 extending laterally therefrom, as in Fig. 2, and to the outer end of which rod 60 or 60' is attached, the latter in turn being pivotally attached to link 59. A tension spring 62 is attached at one end to handle 50 and to the opposite end to a bracket 63 welded or otherwise suitably attached to support S so as to maintain the dogs 21 in inward position. As will be evident, as the cylinder C moves upwardly, when the bell 20 reaches the dogs, the inclined upper edge of the bell will move the dogs outwardly and the dogs will snap to their inner position as soon as the lower edge of bell 20 passes the points of the dogs. The dogs will thereby maintain the cylinder C in its upper position, until released by dog handle 50.

From the foregoing, it will be evident that the soil testing device of this invention fulfills to a marked degree the requirements and objects hereinbefore set forth. As will be evident, the device of this invention is readily mounted on a truck or other vehicle and may be operated from the vehicle without the necessity for disconnecting or dismounting any of the principal operating parts. The device is also operable hydraulically and therefore can produce sufficient force to push the soil tube into the earth and pull it therefrom, all in a minimum amount of time. The parts of the device are also readily movable to a position in which movement of the vehicle by parts mounted thereon is not interfered with, but at the same time may be moved to an elevated position when a point is reached at which a test is to be taken, and thereby accommodate a soil tube of relatively considerable length. Due to the fact that it is necessary only to move the hydraulic control valve to a desired position, in order to set up the device for operation when a point of an initial test is reached, and it is a relatively simple matter to connect and disconnect the soil tube thereto, the set-up time is held to a minimum. The device can be manufactured economically, since little accurate machining is necessary, as most of the parts can be torch cut, while the hydraulic equipment can be purchased as conventional parts.

Although a specific embodiment of this invention has been illustrated and described with particularly, it will be understood that other embodiments may be made and various changes made therein, all without departing from the spirit and scope of this invention.

What is claimed is:

1. In a device for testing soil and the like, a hollow support having an opening at its upper end; a cylinder movable upwardly and downwardly in said support and through said opening; means for supplying fluid under pressure to each end of said cylinder individually and permitting the drainage of fluid therefrom individually; a movable rod extending from the lower end of said cylinder and having at its lower end means for connecting a soil tube and the like; a piston attached to said rod within said cylinder; and releasable means adjacent the upper end of said support for maintaining said cylinder in an upper position.

2. A device for testing soil and the like, comprising a hollow support having an opening at its upper end and provided with means for mounting the same in upright position on a vehicle, said support having at least one stop adjacent its lower end; a cylinder movable upwardly and downwardly in said support and through said opening; a separate hydraulic line leading to each end of said cylinder; means for supplying fluid under pressure through each line individually and permitting the drainage of fluid through each line individually; a piston rod extending from the lower end of said cylinder, said piston rod having at its lower end means for engaging said support stop and means for connecting a soil tube and the like; a piston on said rod within said cylinder; and releasable means adjacent the upper end of said support for maintaining said cylinder in an upper position.

3. A device for testing soil and the like, comprising a hollow support having an opening at its upper end and having at least one stop adjacent its lower end; a cylinder movable upwardly and downwardly in said support and through said opening; a separate hydraulic line leading to each end of said cylinder; means for supplying fluid under pressure through each line individually and permitting the drainage of fluid through each line individually; a piston rod extending from the lower end of said cylinder, said piston rod having at its lower end means for engaging said support stop and means for connecting a soil tube and the like; a piston on said rod within said cylinder; and releasable means adjacent the upper end of said support for maintaining said cylinder in an upper position.

4. A device for testing soil and the like, as defined in claim 3, wherein said releasable means includes a pair of dogs movable inwardly and outwardly of said support.

5. A device for testing soil and the like, as defined in claim 4, wherein said cylinder is provided at its lower end with cam means for moving said dogs outwardly; and resilient means for urging said dogs inwardly.

6. A device for testing soil and the like, as defined in claim 3, wherein the hydraulic line leading to the bottom of said cylinder includes a pipe extending alongside and attached to the outside of said cylinder; and wherein said support is provided with spaced plates extending thereabout adjacent the upper end thereof, each said plate having an aperture corresponding to the outer periphery of said cylinder and a notch to accommodate said pipe.

7. A device for testing soil and the like as defined in claim 3, wherein said support is cut away longitudinally at the front from a point spaced from the upper end to the lower end to provide access to the interior thereof.

8. A device for testing soil and the like, as defined in claim 7, wherein spaced blocks are attached to the inside of said cylinder at a position spaced from the lower end to form stops; and wherein a plate is attached to the outside of the lower end of said cylinder for reinforcement.

9. A device for testing soil and the like, as defined in claim 3, wherein said means for connecting a soil tube is provided with a laterally extending flange for engaging said support stop.

10. A device for testing soil and the like, as defined in claim 3, wherein said means for connecting a soil tube comprises a connector having a socket at each end for receiving said piston rod and said soil tube respectively, and the wall of the lower socket is provided with holes for insertion of a pin to removably attach said soil tube thereto.

11. A device for testing soil and the like, comprising a hollow tubular support provided with means for mounting the same in upright position on a vehicle, said support being cut away longitudinally at the front from a point spaced from its upper end to its lower end, said support having a pair of plates extending thereacross in spaced vertical relation above said front opening and blocks welded to the inside adjacent its lower end to form stops; a tubular cylinder having a closed upper end and a bell closing its lower end, said bell having a greater outer diameter than said cylinder and an outwardly inclined upper end; a piston rod having a piston at its upper end within said cylinder, said piston rod extending through said bell; a hydraulic connection for the upper end of said cylinder; a pipe attached to the outside of said cylinder and extending from a point above the upper end of said cylinder to said bell, the lower end of said pipe extending through said bell to the inside of said cylinder at the lower end thereof, said support plates having aligned circular apertures therein corresponding in size to said cylinder and having a notch at one side to accommodate said pipe, said plate apertures thereby guiding said cylinder during upward and downward movement and restraining twisting of said cylinder during such movement; a connector for a soil tube or the like attached to the lower end of said piston rod and having a circular, laterally extending flange having a diameter corresponding to the inside of said support for guiding the lower end of said piston rod during upward and downward movement and for engaging said stops; a pair of dogs pivoted at their lower ends on the outside of said support in opposed positions and having inwardly extending upper ends engageable by the inclined surface at the upper end of said bell so as to be moved outwardly and movable inwardly beneath said bell to support said cylinder in an upper position, said support having opposed slots through which the upper ends of said dogs may move; an outwardly extending stud attached to the outside of said support in a position intermediate said dogs; a link and a lever connected together and pivoted on said stud; an arm extending laterally from each dog; a rod pivotally connecting each said arm with said link; a handle pivoted on said support below said link and lever; a rod pivotally connecting said handle with said lever; a spring connected between said handle and said support for urging said dogs inwardly; a separate hydraulic line leading to said hydraulic connection and said pipe on said cylinder; and means for supplying fluid under pressure through each line individually and permitting the drainage of fluid through each line individually.

References Cited in the file of this patent

UNITED STATES PATENTS

| | | |
|---|---|---|
| 2,176,477 | Varney et al. | Oct. 17, 1939 |
| 2,280,592 | Le Mieux, Jr. | Apr. 21, 1942 |
| 2,287,059 | Platts et al. | June 23, 1942 |

FOREIGN PATENTS

| | | |
|---|---|---|
| 896,253 | France | Apr. 24, 1944 |